(12) United States Patent
Matsumoto et al.

(10) Patent No.: US 8,795,060 B2
(45) Date of Patent: Aug. 5, 2014

(54) GAME PROCESSING SERVER APPARATUS AND RECORDING MEDIUM

(71) Applicant: DeNA Co., Ltd., Tokyo (JP)

(72) Inventors: Yoshitaka Matsumoto, Tokyo (JP);
 Kazuhiro Kondo, Tokyo (JP);
 Shonosuke Tokumaru, Tokyo (JP);
 Masataka Okihara, Tokyo (JP); Kosuke Takami, Tokyo (JP); Tatsuya Koyama, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 13/937,328

(22) Filed: Jul. 9, 2013

(65) Prior Publication Data
US 2014/0087882 A1 Mar. 27, 2014

(30) Foreign Application Priority Data

Sep. 21, 2012 (JP) ................................ 2012-208458

(51) Int. Cl.
 *A63F 9/24* (2006.01)
 *A63F 13/00* (2014.01)
(52) U.S. Cl.
 CPC ......... *A63F 13/00* (2013.01); *A63F 2300/5566* (2013.01); *A63F 2300/5546* (2013.01); *A63F 2300/558* (2013.01)
 USPC ........... 463/23; 463/6; 463/8; 463/29; 463/42
(58) Field of Classification Search
 None
 See application file for complete search history.

(56) References Cited

U.S. PATENT DOCUMENTS

| 6,319,121 | B1* | 11/2001 | Yamada et al. | 463/8 |
|---|---|---|---|---|
| 6,347,993 | B1* | 2/2002 | Kondo et al. | 463/1 |
| 6,394,904 | B1* | 5/2002 | Stalker | 463/23 |
| 8,142,268 | B2* | 3/2012 | Thomas et al. | 463/6 |
| 8,425,330 | B1* | 4/2013 | Kislyi et al. | 463/42 |
| 2002/0160835 | A1* | 10/2002 | Fujioka et al. | 463/31 |
| 2004/0266506 | A1* | 12/2004 | Herbrich et al. | 463/6 |
| 2007/0207860 | A1* | 9/2007 | Yamauchi et al. | 463/42 |
| 2008/0280683 | A1* | 11/2008 | Nakaji | 463/40 |
| 2010/0248830 | A1* | 9/2010 | Otomo et al. | 463/31 |
| 2011/0092286 | A1* | 4/2011 | Bradbury et al. | 463/31 |
| 2012/0231890 | A1* | 9/2012 | Junkin et al. | 463/42 |
| 2012/0302332 | A1* | 11/2012 | Buhr | 463/29 |

FOREIGN PATENT DOCUMENTS

| JP | 2008-036240 | 2/2008 |
|---|---|---|
| JP | 2008-279049 | 11/2008 |

OTHER PUBLICATIONS

Japanese Office Action mailed Oct. 8, 2013.

* cited by examiner

*Primary Examiner* — Dmitry Suhol
*Assistant Examiner* — Jason Yen
(74) *Attorney, Agent, or Firm* — IPUSA, PLLC (57) ABSTRACT

A game processing server apparatus providing a game service to a plurality of terminal devices connected with each other via a network, includes a game data generation unit that generates game data in the game service; a player information storing unit that stores player information including registration date data indicating a date when the player operating the terminal device is registered in the game service; and a group allocation unit that determines a player group to which the player belongs based on the registration date data of the player, wherein the game data generation unit generates game data for training, which is different from normal game data, to the player who belongs to the player group.

11 Claims, 6 Drawing Sheets

| PLAYER ID | PLAYER ATTRIBUTE | GAME PARTICIPANT REGISTRATION DATE | LOG-IN TIME HISTORY | BELONGING GROUP ID | OBTAINED POINT/ITEM ID IN TRAINING GAME | OBTAINED POINT/ITEM ID IN NORMAL GAME | OTHER GAME DATA | ... |

| GROUP ID | GROUP ATTRIBUTE | UPPER NUMBER | CURRENT NUMBER | ... |

46

GAME PROCESSING SERVER APPARATUS AND RECORDING MEDIUM

BACKGROUND OF THE INVENTION

1. Field of the Invention

The present invention relates to a game processing server apparatus and a recording medium.

2. Description of the Related Art

A social game is provided on a social networking service (SNS), and is a network game (online game) in which a player plays the game while having communications with other players. Although there has also been a network game in which a function to have communications with other players is provided, however, the social game provides many communication opportunities to players because the social game is provided on the SNS that aims for communications between users.

In such a network game, an event is provided, which is composed of a guest (mission) in which a player character walks through a predetermined area in a map, a battle against a boss character in which the player character fights against an enemy character or the like, so that the player becomes excited over the battle, and enjoys obtaining points or items.

However, there may be a possibility that a motivation of a player to continue a game is lowered so that his or her activity (the number of times of playing the game, the period for playing the game or the like) is decreased by various causes.

In particular, there is a high possibility that a player who has just started the game cannot play the game advantageously because the player does not understand the characteristic of the game enough, or does not possess items such as accessories or the like as the game does not proceed enough. Thus, the motivation of such a player is lowered so that the activity is decreased. Similarly, the same thing happens to a player who has been spending time without understanding the characteristic of the game enough after starting the game.

SUMMARY OF THE INVENTION

The present invention is made in light of the above problems, and provides a mechanism capable of drastically improving motivation of players.

According to an embodiment, there is provided a game processing server apparatus providing a game service to a plurality of terminal devices connected with each other via a network, including: a game data generation unit that generates game data in the game service; a player information storing unit that stores player information including registration date data indicating a date when the player operating the terminal device is registered in the game service; and a group allocation unit that determines a player group to which the player belongs based on the registration date data of the player, wherein the game data generation unit generates game data for training, which is different from normal game data, to the player who belongs to the player group.

According to another embodiment, there is provided a non-transitory computer-readable recording medium having recorded thereon a program that causes a computer that composes a game processing server apparatus providing a game service to a plurality of terminal devices connected with each other via a network, to execute functions, including: a game data generation function that generates game data in the game service; a player information storing function that stores player information including registration date data indicating a date when the player operating the terminal device is registered in the game service; and a group allocation function that determined a player group to which the player belongs based on the registration date data of the player, wherein the game data generation function generates game data for training, which is different from normal game data to the player who belongs to the player group.

Note that also arbitrary combinations of the above-described elements, and any changes of expressions in the present invention, made among methods, devices, systems, recording media, computer programs and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

DETAILED DESCRIPTION OF THE PREFERRED EMBODIMENTS

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

Conventionally, as one of general methods to increase motivation of players, ranking is displayed. In the displayed ranking, the players are displayed in descending order of points or the like to cause the players to have competitive spirits to other players and improve the motivations of the players.

However, in a general event, there is a gap between a player with a high activity in a game and a player with a low activity in the game when a large number of players participate so that the player with a low activity has little possibility to get a high ranking and tends to loose motivation to continue the game. This tendency is strong in a social game in which many communication opportunities exist.

Similarly, as another one of general methods to increase motivation of players, there is a system in which the players are divided into groups. In this system, the players of the same level are gathered into a same group based on the obtained points or the like, and the players compete with each other in the group based on the results such as the obtained points or the like in the game. In this case, the gap between the players can be decreased to improve the motivation of the players.

However, although the motivation of the player may be improved a bit by being divided into the group, for a player of a lower level, such a player is low in activity in the game before being divided into the group. Thus, the activity of the player in the game cannot be drastically improved.

(Structure)

Figure 1:
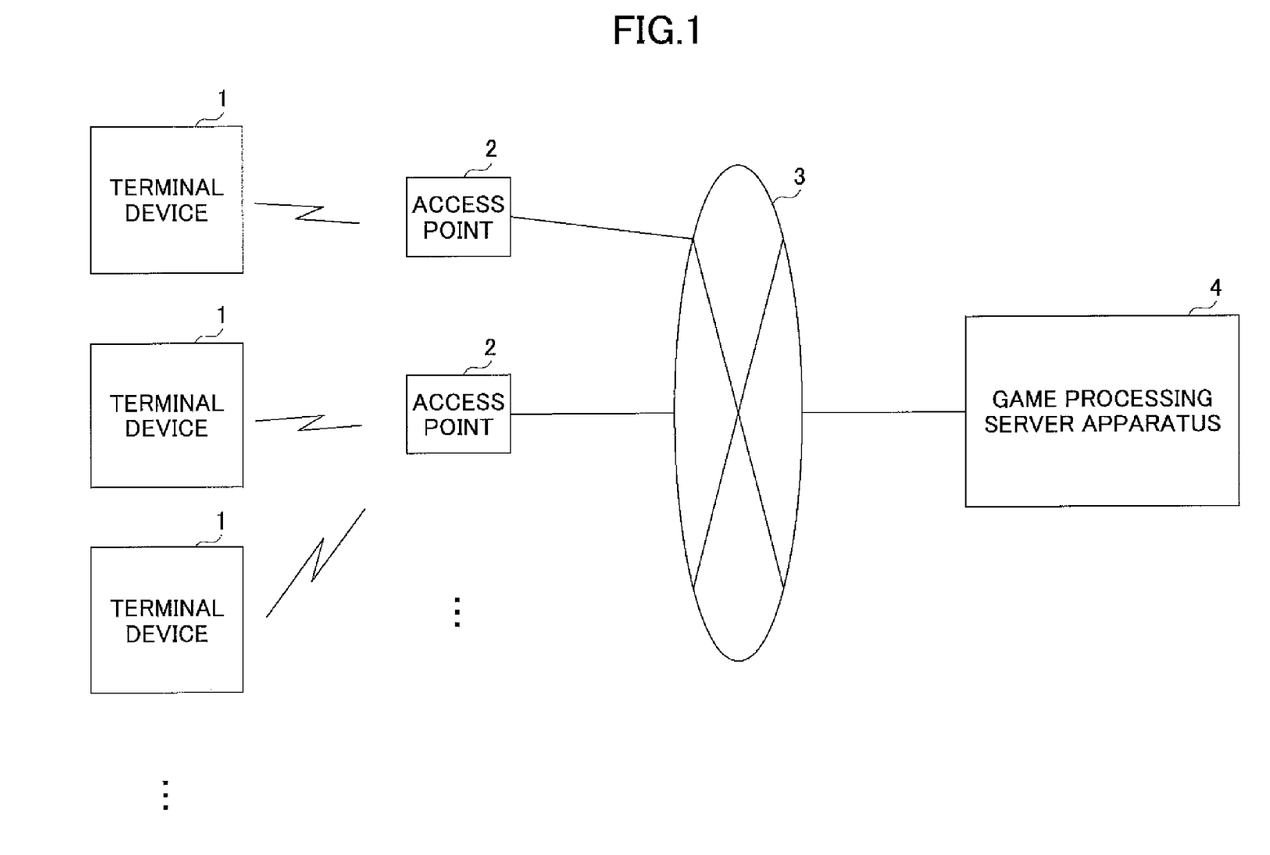
FIG. 1 is a block diagram illustrating a structure of an example of a system of an embodiment.

FIG. 1 is a block diagram illustrating a structure of an example of a system of an embodiment.

The system shown in FIG. 1 includes a plurality of terminal devices (player terminals) 1 which belong to players, respectively, access points 2 such as a mobile base station, a Wi-Fi station or the like, a network 3 such as the INTERNET or the like, and a game processing server apparatus 4. The game processing server apparatus 4 controls (manages) processing of a game in which a plurality of players play a game via the network 3. The terminal device 1 may be a smart phone, a mobile phone, or the like.

Figure 2:
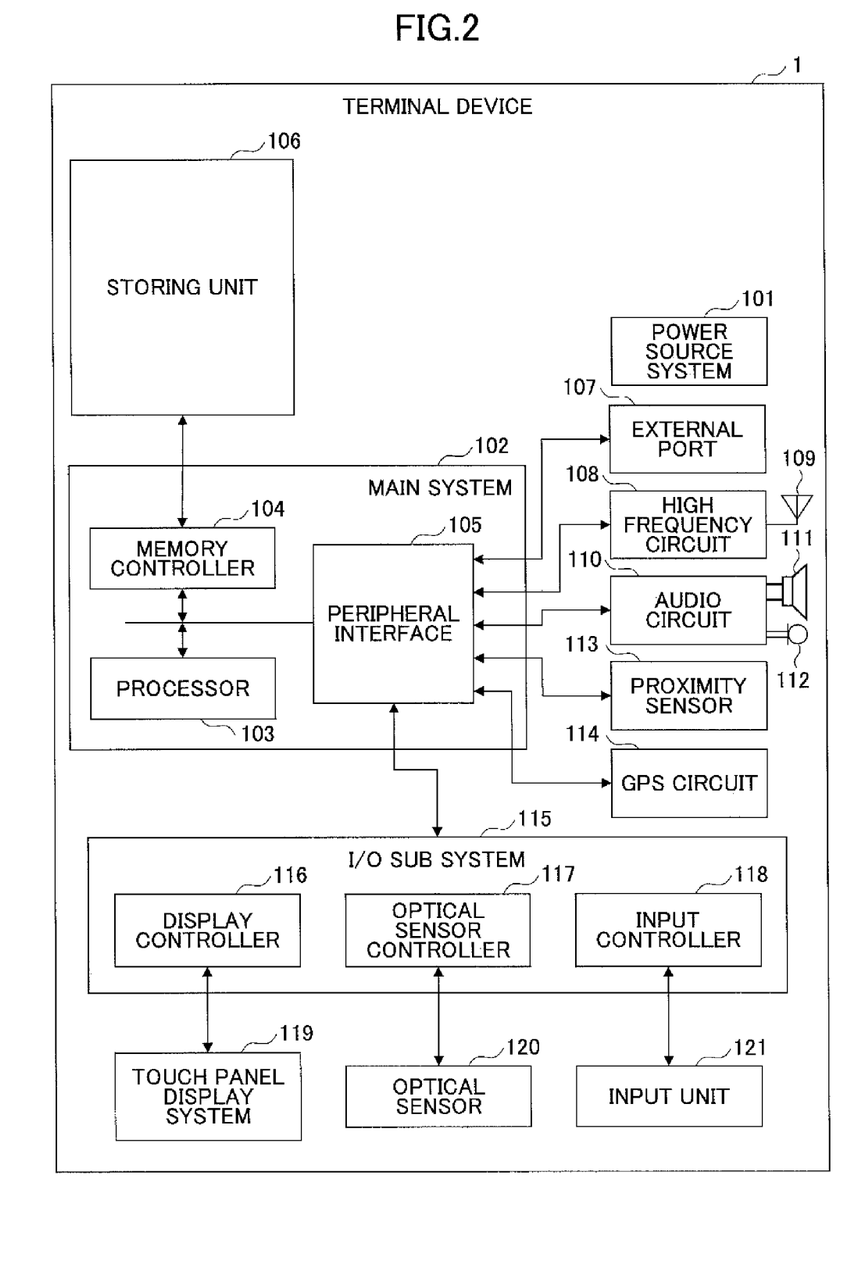
FIG. 2 is a block diagram illustrating an example of a hardware structure of a terminal device.

FIG. 2 is a block diagram illustrating an example of a hardware structure of the terminal device 1.

The terminal device 1 includes a power source system 101, a main system 102, a storing unit 106, an external port 107, a high frequency circuit 108, an antenna 109, an audio circuit 110, a speaker 111, a microphone 112, a proximity sensor 113, a Global Positioning System (GPS) circuit 114, an I/O sub system 115, a touch panel display system 119, an optical sensor 120 and an input unit 121. The main system 102 includes a processor 103, a memory controller 104 and a peripheral interface 105. The I/O sub system 115 includes a display controller 116, an optical sensor controller 117, and an input controller 118.

Figure 3:
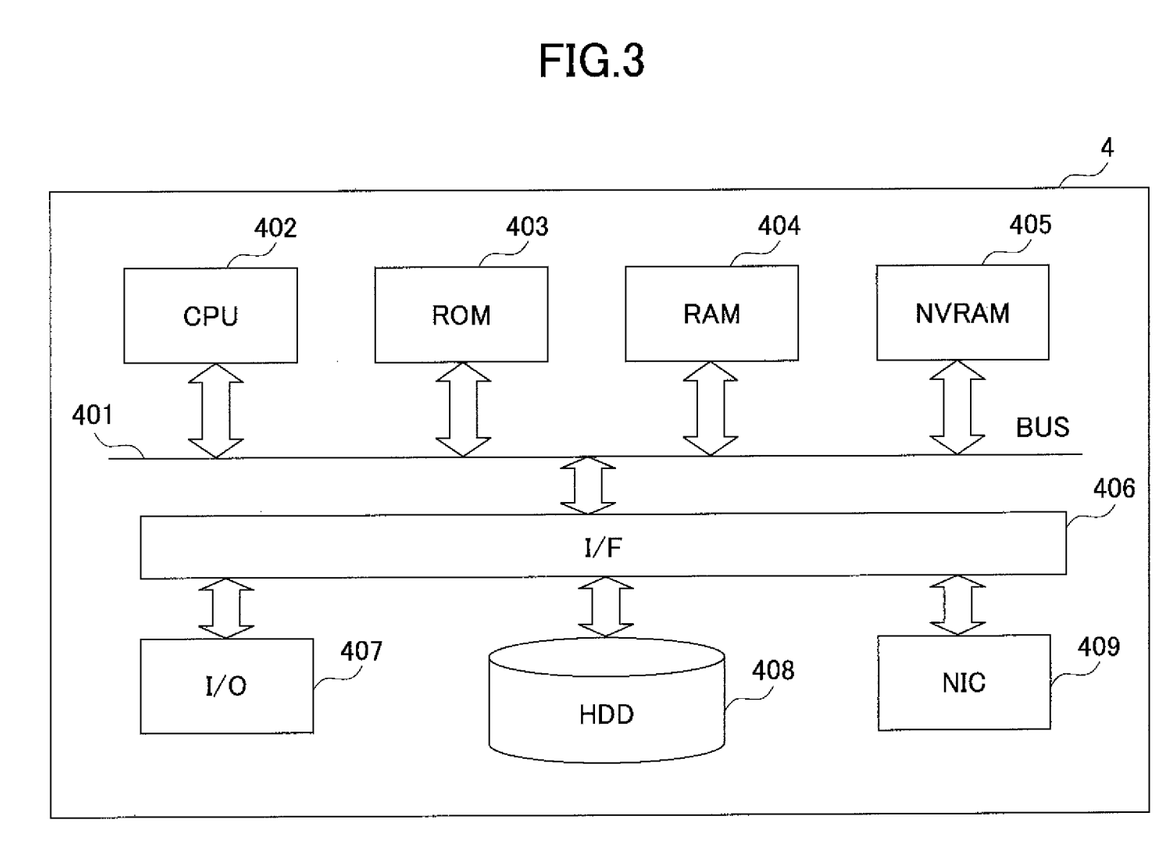
FIG. 3 is a block diagram illustrating an example of a hardware structure of a game processing server apparatus.

FIG. 3 is a block diagram illustrating an example of a hardware structure of the game processing server apparatus 4.

The game processing server apparatus 4 includes a Central Processing Unit (CPU) 402, a Read Only Memory (ROM) 403, a Random Access Memory (RAM) 404, a non-Volatile Random Access Memory (NVRAM) 405 and an Interface (I/F) 406 connected to a system bus 401, and an Input/Output Device (I/O) 407 such as a keyboard, a mouse, a monitor, a Compact Disk/Digital Versatile Disk (CD/DVD) drive or the like, a Hard Disk Drive (HDD) 408, and a Network Interface Card (NIC) 409 connected to the I/F 406, and the like.

Figure 4:
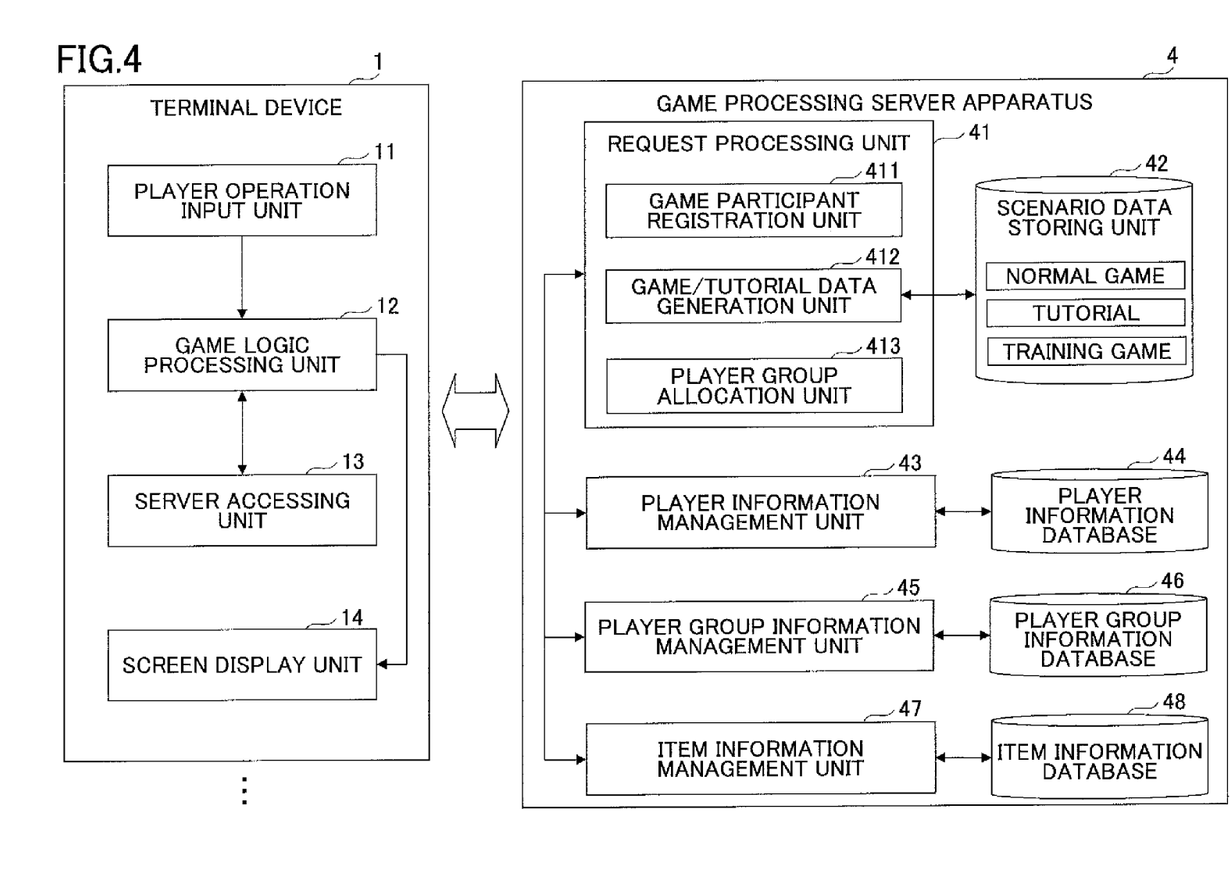
FIG. 4 is a block diagram illustrating an example of a functional structure of the terminal device and the game processing server apparatus.

FIG. 4 is a block diagram illustrating an example of a functional structure of the terminal device 1 and the game processing server apparatus 4.

In FIG. 4, the terminal device 1 includes a player operation input unit 11, a game logic processing unit 12, a server accessing unit 13 and a screen display unit 14.

The player operation input unit 11 has a function to input (accept) an operation of a player of the terminal device 1.

The game logic processing unit 12 has a function to process a game by transitioning screens in accordance with the input operation by the player via the player operation input unit 11. The game logic processing unit 12 may execute the game logic based on page data described in a Hyper Text Markup Language (HTML) or the like and scripts or the like included in the page data sent from the game processing server apparatus 4 (which is called browser type). Alternatively, the game logic processing unit 12 may execute the game logic based on application which is previously downloaded and installed in the terminal device 1 (which is called application type).

The server accessing unit 13 has a function to send a request to the game processing server apparatus 4 and receive a processed result or the like as a response from the game processing server apparatus 4 when it is necessary to access the game processing server apparatus 4 in a course of the processing by the game logic processing unit 12. Here, the request includes a request of updating and a request of referring to data. The request of updating is to update player information. The request of referring to data is to refer to the player information.

The screen display unit 14 has a function to display screens under control of the game logic processing unit 12.

The game processing server apparatus 4 includes a request processing unit 41, a scenario data storing unit 42, a player information management unit 43, a player information database 44, a player group information management unit 45, a player group information database 46, an item information management unit 47 and an item information database 48. The request processing unit 41 includes a game participant registration unit 411, a game/tutorial data generation unit 412 and a player group allocation unit 413.

The request processing unit 41 has a function to receive a request from the terminal device 1, perform a corresponding process and send a processed result of the request to the terminal device 1. When the request processing unit 41 receives the request of updating, the request processing unit 41 performs an operation to update the player information, and sends the updated player information or the like which is changed by the operation as the processed result. When the request processing unit 41 receives the request of referring to data, the request processing unit 41 refers to and obtains the corresponding player information, and sends the obtained player information as the processed result. The response may include screen information which is to be operated by the player next, in addition to the required processed result, for the browser type.

The scenario data storing unit 42 stores scenario data that describes progression contents of a game and a tutorial. The scenario data includes data corresponding to a normal game, data corresponding to the tutorial and data corresponding to a training game. The normal game is an ordinary game other than the tutorial and the training game. The tutorial is to provide minimum information to play a game to a player. Alternatively, the tutorial may not be included in the game service.

The training game is a newcomer training game for training a newcomer player, or a follow-up training game for a player who has already been playing the game. The newcomer training game is, for example, an event to be provided to a player group generated by players whose game participant registration date is the same. The newcomer training game is composed by, similarly as the normal game, a quest, a battle against a boss or the like. The type of the quest or the battle against a boss or the difficulty in the game is adjusted in order for the player to easily understand the characteristic of the game. Further, characters or the like are changed from those of the normal game in order to differentiate the training game from the normal game.

Although the players are qualified to participate in the newcomer training game after finishing the tutorial, when there is no tutorial, the tutorial is skipped or the like, the player may be qualified to participate in the newcomer training game right after the game participant registration. Normally, the tutorial is provided right after the player is registered to participate in the game. Then, the newcomer training game is performed on the next day of the day when the player is registered to participate in the game. The newcomer training game is performed for three days, for example. The game processing server apparatus 4 calculates the points obtained by each of the players during the quest or the battle against the boss and a ranking is displayed based on the calculated results at a middle of the training game and at the end (when three days passed) of the training game.

The game participant registration unit 411 has a function to register a player in the player information database 44 via the player information management unit 43 in response to a game participant registration request from the terminal device 1.

The game/tutorial data generation unit 412 has a function to generate (obtain) tutorial data and game data to be provided to the terminal device 1 by referring to the scenario data storing unit 42. The game/tutorial data generation unit 412 may further refer to the player information database 44, the player group information database 46 and the item information database 48 via the player information management unit 43, the player group information management unit 45 and the item information management unit 47, respectively. For the browser type, the tutorial data and the game data are page data for displaying screens. For the application type, the tutorial data and the game data are data necessary for the terminal device 1 to proceed the game and the tutorial. For the application type, the tutorial data and the game data include information regarding other players stored in the game processing server apparatus 4, information from an administrator or the like. The game data includes data for displaying ranking of each of the players based on the obtained point or the like.

The player group allocation unit 413 has a function to refer to the player group information database 46 via the player group information management unit 45, allocate a player to a player group for the training game and update the player information database 44 via the player information management unit 43. Further, when it is necessary, the player group allocation unit 413 updates the player group information database 46 via the player group information management unit 45 to generate a new player group.

The player information management unit 43 has a function to manage various information about all of the players participating in the game, which are stored in the player information database 44. The player information management unit 43 refers to or updates the player information in accordance with the request from the request processing unit 41.

Figure 5:
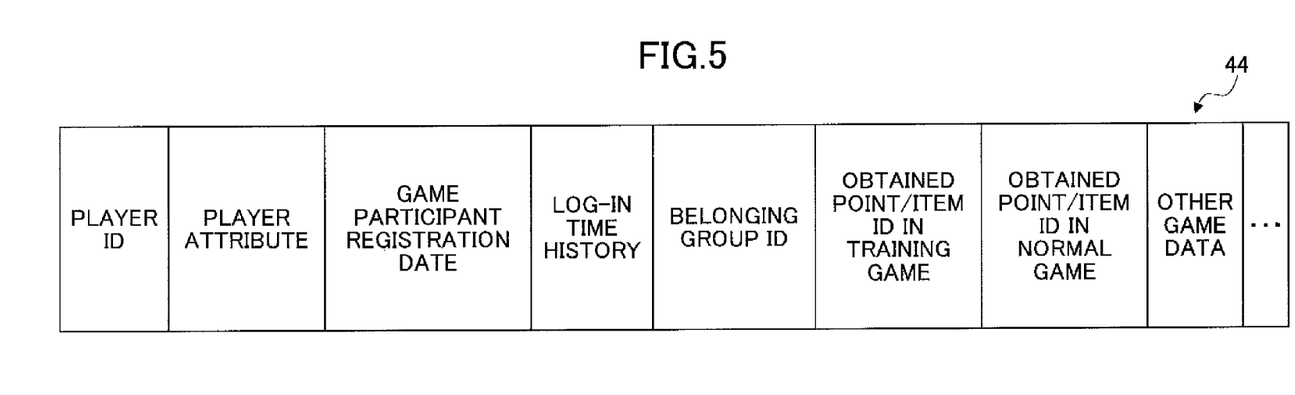
FIG. 5 is a view illustrating an example of a data structure of a player information database.

FIG. 5 is a view illustrating an example of a data structure of the player information stored in the player information database 44.

In FIG. 5, the player information includes fields such as "player ID", "player attribute", "game participant registration date", "log-in time history", "belonging group ID", "obtained point/item ID in training game", "obtained point/item ID in normal game", "other game data" and the like.

The "player ID" is data to specify (identify) the player. The "player attribute" is data such as sex, age, clan (provided for each of the player groups in which the players play the training game) or the like of the player. The "game participant registration date" is data indicating a date (time) when the player is registered to participate in the game. The "log-in time history" is history data indicating a date (time) when the player logs-in. The "belonging group ID" is data to specify (identify) the player group to which the player belongs when the player participates in the training game. The "obtained point/item ID in training game" is data indicating the point or the item obtained by the player in the training game. The "obtained point/item ID in normal game" is data indicating the point or the item obtained by the player in the normal game. The "other game data" is data indicating an activity (the number of times that the player logs-in, the period from the log-in to log-out or the like) or the like of the player regarding other games.

Referring back to FIG. 4, the player group information management unit 45 has a function to manage various information regarding player groups (player group information), which are stored in the player group information database 46.

The player group information management unit 45 refers to or updates the player group information in accordance with the request from the request processing unit 41.

Figure 6:
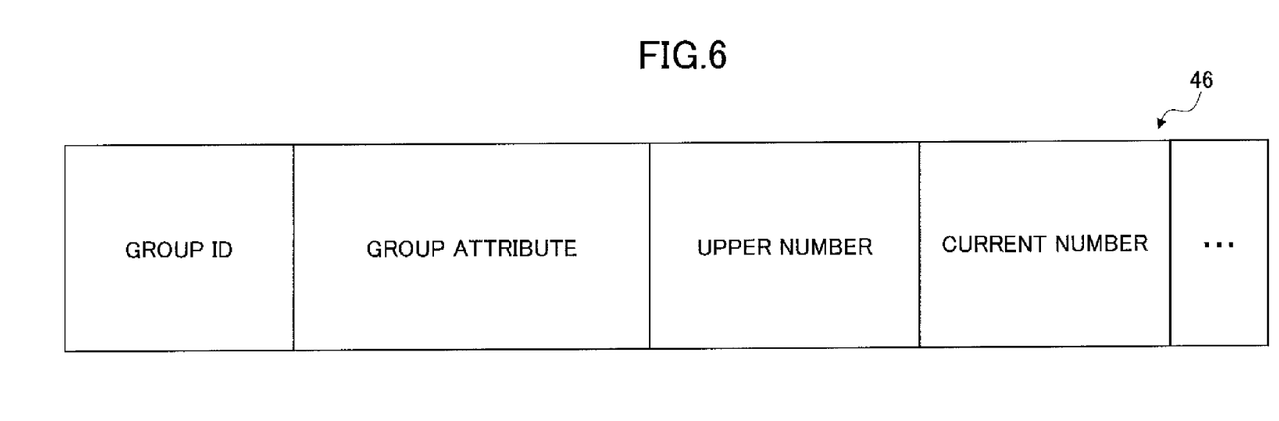
FIG. 6 is a view illustrating an example of a data structure of a player group information database.

FIG. 6 is a view illustrating an example of a data structure of the information stored in the player group information database 46. The player group information database 46 includes fields such as "group ID", "group attribute", "upper number" (upper limit number of members), "current number" (current number of members) and the like.

The "group ID" is data to specify (identify) the player group. The "group attribute" is data indicating profile or property of the player group. For example, when it is determined that the players who are registered on the same day are to belong to the player group, for example, the "game participant registration date" is stored as the "group ID". The "upper number" is data to indicate the upper limit number of the players when there is a limitation in the number of the players in the player group. The "current number" is data to indicate the current number of the players who belong to the player group.

Referring back to FIG. 4, the item information management unit 47 has a function to manage various information (item information) regarding items (game content, or game media), which are stored in the item information database 48. The item information management unit 47 refers to or updates the item information in accordance with the request from the request processing unit 41. The item information database 48 includes fields such as "item ID" to specify (identify) the item, "item image" for displaying the item, item attributes "parameter (offense, defense, rare degree, type, . . . )" and the like.

(Operation)

Figure 7:
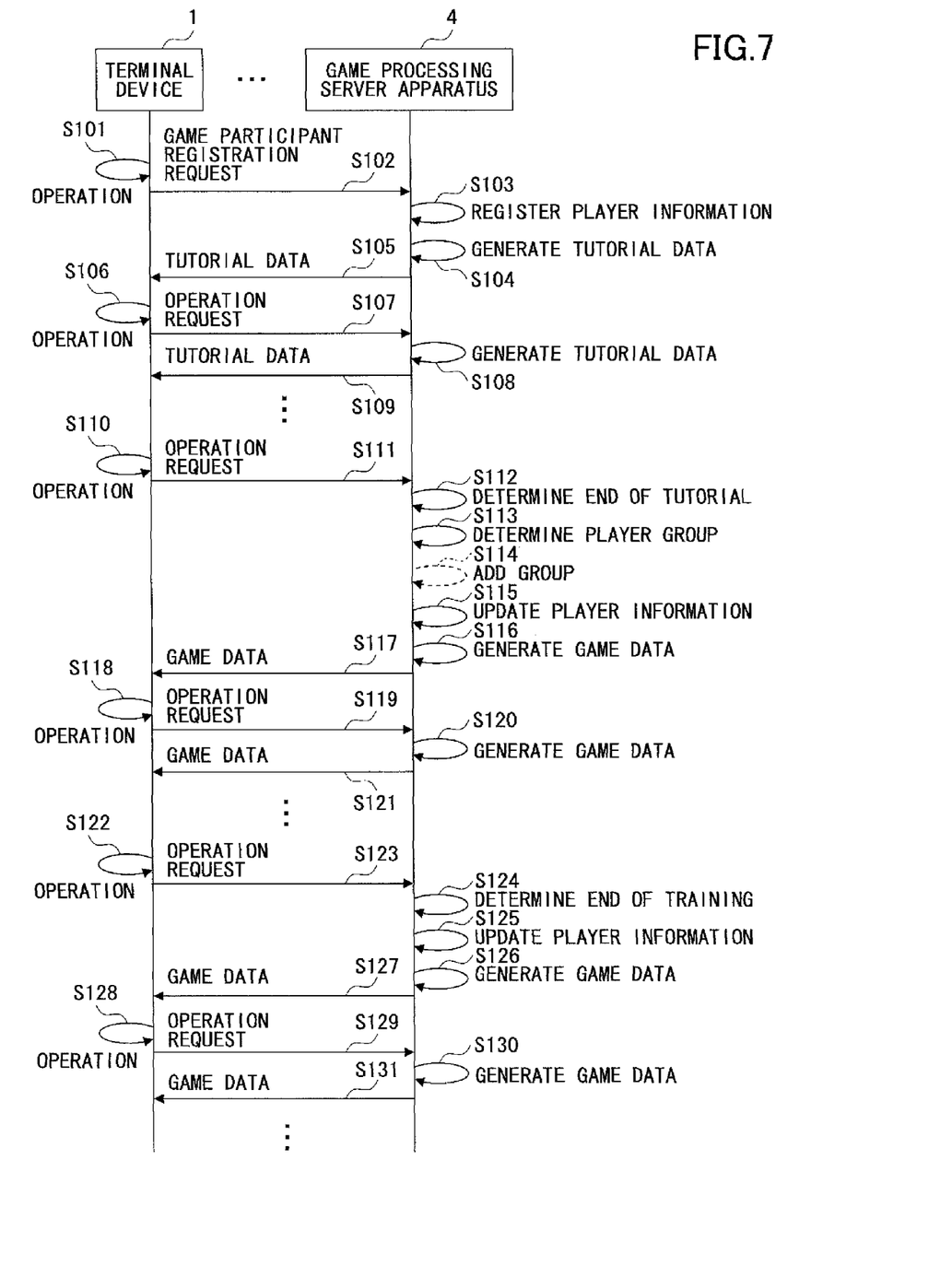
FIG. 7 is a sequence diagram illustrating an example of an operation of the embodiment.

FIG. 7 is an example of a sequence diagram illustrating an example of an operation of the game processing server apparatus 4 and the terminal device 1.

In FIG. 7, when the player of the terminal device 1 operates for a game participant registration, and the player operation input unit 11 accepts the operation (step S101), under control of the game logic processing unit 12, the server accessing unit 13 sends a game participant registration request to the game processing server apparatus 4 with player attribute data or the like (step S102).

At the game processing server apparatus 4, upon receiving the game participant registration request, the game participant registration unit 411 of the request processing unit 41 registers player information in the player information database 44 via the player information management unit 43 (step S103). At this time, the game participant registration unit 411 issues player ID, registers the accepted player attribute and records game participant registration date.

The game/tutorial data generation unit 412 of the request processing unit 41 refers to the tutorial in the scenario data storing unit 42, generates tutorial data to be provided to the terminal device 1 (step S104) and sends the generated tutorial data to the terminal device 1 (step S105). Then, the tutorial starts.

Thereafter, when the player of the terminal device 1 operates a screen of the tutorial, and the player operation input unit 11 accepts the operation (step S106), the server accessing unit 13 sends a corresponding operation request to the game processing server apparatus 4 (step S107). The operation request is a request for a next page for the browser type and a request for data necessary in progression of the tutorial for the application type.

At the game processing server apparatus 4, upon receiving the operation request, the game/tutorial data generation unit 412 of the request processing unit 41 refers to the tutorial in the scenario data storing unit 42, generates next tutorial data to be provided to the terminal device 1 (step S108) and sends the generated tutorial data to the terminal device 1 (step S109). These steps are repeated while the tutorial is continued.

When the player of the terminal device 1 operates to complete the tutorial in the screen of tutorial, and the player operation input unit 11 accepts the operation (step S110), the server accessing unit 13 sends a corresponding operation request to the game processing server apparatus 4 (step S111).

At the game processing server apparatus 4, upon receiving the operation request, the game/tutorial data generation unit 412 of the request processing unit 41 determines that the tutorial is finished (step S112).

The player group allocation unit 413 of the request processing unit 41 determines the player group to which the player belongs for a successive newcomer training game after the tutorial (step S113). Here, it is assumed that the players who register to participate in the game on the same day are included in the same player group. In such a case, the player group allocation unit 413 obtains group ID whose group attribute is the game participant registration date of the player from the player group information database 46, and set the group ID as the belonging group ID of the player in the player information (step S115). When the corresponding player group does not exist, or the number of players included in the existing group reaches the upper limit, the player group information database 46 adds a new record for a player group (step S114).

The game/tutorial data generation unit 412 of the request processing unit 41 refers to the training game (newcomer training game) in the scenario data storing unit 42, generates game data of the newcomer training game to be provided to the terminal device 1 (step S116), and sends the generated game data to the terminal device 1 (step S117). Then, the newcomer training game starts.

Thereafter, when the player of the terminal device 1 operates a screen of the newcomer training game, and the player operation input unit 11 accepts the operation (step S118), the server accessing unit 13 sends a corresponding operation request to the game processing server apparatus 4 (step S119). The operation request is a request for a next page for the browser type and request for data necessary in progression of newcomer training game for the application type.

At the game processing server apparatus 4, upon receiving the operation request, the game/tutorial data generation unit 412 of the request processing unit 41 refers to the training game (newcomer training game) in the scenario data storing unit 42, generates successive game data to be provided to the terminal device 1 (step S120) and sends the generated game data to the terminal device 1 (step S121). These steps are repeated while the newcomer training game is continued.

In the newcomer training game, similarly as the normal game, a quest or a battle against a boss is performed, and a player can obtain a point or an item. The item obtained in the newcomer training game can be used in the normal game. Further, the game/tutorial data generation unit 412 generates data for displaying a ranking in the player group based on the point or the like, to be included in the game data.

When the player of the terminal device 1 operates to complete the newcomer training game in the screen of the newcomer training game, and the player operation input unit 11 accepts the operation (step S122), the server accessing unit 13 sends a corresponding operation request to the game processing server apparatus 4 (step S123).

At the game processing server apparatus 4, upon receiving the operation request, the game/tutorial data generation unit 412 of the request processing unit 41 determined that the newcomer training game is finished (step S124).

The player group allocation unit 413 of the request processing unit 41 deletes the belonging group ID of the player in the player information in the player group information database 46 so that the allocation of the player to the player group is released in accordance with the end of the newcomer training game (step S125).

The game/tutorial data generation unit 412 of the request processing unit 41 refers to the normal game in the scenario data storing unit 42, generates game data of the normal game to be provided to the terminal device 1 (step S126) and sends the generated game data to the terminal device 1 (step S127). Then, the normal game starts.

Thereafter, when the player of the terminal device 1 operates a screen of the normal game, and the player operation input unit 11 accepts the operation (step S128), the server accessing unit 13 sends a corresponding operation request to the game processing server apparatus 4 (step S129). The operation request is a request for a next page for the browser type and a request for data necessary in progression of the normal game for the application type.

At the game processing server apparatus 4, upon receiving the operation request, the game/tutorial data generation unit 412 of the request processing unit 41 refers to the normal game in the scenario data storing unit 42, generates successive game data to be provided to the terminal device 1 (step S130) and sends the generated game data to the terminal device 1 (step S131). These steps are repeated while the normal game is continued.

As described above, it is expected to show a greater effect by allocating players to a player group and having the players perform the newcomer training game right after the tutorial or right after the player is registered to participate in the game, compared with a general method of allocating players to a group based on levels of players. This is because the player has a high motivation and is expected to perform an activity when the player has just started the game.

Further, for the players who are registered to participate in the game within the same period, there is no difference in progression or comprehension in the game, and the players can start the game from a same starting point. It means that the players can start the game from zero in progression or comprehension in the game right after the registration to participate in the game so that all of the players can have motivations to get a superior ranking. As the players are equally given opportunities to get a superior ranking, the players are motivated to increase the activity in the game.

Further, in the above embodiment, an example in which the newcomer training game is provided to the player group generated by the players who are registered to participate in the game on the same day is shown. Alternatively, provided that there is little difference in progression or comprehension in the game among players and the players can start the game together at the same state, the newcomer training game may be provided to a player group formed by players whose game participant registration date is within a predetermined period, or a player group formed by players who have finished the tutorial on the same day or within a predetermined period.

Further, when the number of players who are registered on the same day is large, a plurality of player groups each having an upper limit may be generated so that the players can fight for the ranking within a small number of players in each of the player groups. With this, the motivation of the player can be increased.

The players may be allocated to a player group based on the attributes of the players or the activities in the other games. At this time, the player attribute or other game data in the player information database 44 can be used.

Even in such an environment, there is a possibility that a gap is generated between a player with a high activity in the game (with a high motivation) and a player without the high activity in the game in the same player group. Thus, for example, the players in the same player group may be further divided into groups in the newcomer training game in accordance with the activities of the players so that the players act together with other players in the same player group and stimulate with each other to increase the game activity. As a standard activity, the log-in time history of the player information database 44 can be used. Further, not limited to the activity of the game, the other game data in the player information database 44 may be used.

Further, the player may be provided with rewards in descending order in a ranking, and further provided with entry rewards just for participating in the training game. With this configuration, the player of a lower rank can be motivated to start a normal game.

Further, a predetermined attribute (clan for ninja, for example) may be provided to the players in the same player group in the training game in order to increase a bonding between the players. With this, the players provided with the same predetermined attribute may be encouraged to have communications with each other in a normal game.

Although the newcomer training game is exemplified as the training game, a follow-up training game may be provided in which the players who are registered within the same period are divided into the player group after a predetermined period (for example, after six months or the like) has passed since the players were registered to participate in the game. In this case, the players are allocated to a group similarly for the case of the newcomer training game.

At this time, it is expected to show a greater effect by allocating the players to a player group and having the players perform the follow-up training at timing when the motivation of the players is started to be lowered but not lowered too mach after a predetermined time has passed from the registration, compared with a general method of allocating players to a group based on levels of players.

As described above, according to the embodiment, a mechanism capable of drastically improving motivation of players can be provided.

The individual constituents of the terminal device 1 and the game processing server apparatus 4 may be embodied by arbitrary combinations of hardware and software, typified by a CPU of an arbitrary computer, a memory, a program loaded in the memory so as to embody the constituents illustrated in the drawings, a storage unit for storing the program such as a hard disk, and an interface for network connection. It may be understood by those skilled in the art that methods and devices for the embodiment allow various modifications.

Although a preferred embodiment of the terminal device 1 and the game processing server apparatus 4 has been specifically illustrated and described, it is to be understood that minor modifications may be made therein without departing from the spirit and scope of the invention as defined by the claims.

The present invention is not limited to the specifically disclosed embodiments, and numerous variations and modifications and modifications may be made without departing from the spirit and scope of the present invention.

The present application is based on and claims the benefit of priority of Japanese Priority Application No. 2012-208458 filed on Sep. 21, 2012, the entire contents of which are hereby incorporated by reference.

What is claimed is:

1. A game processing server apparatus providing a game service to a plurality of terminal devices connected with each other via a network, comprising:
    a game data generation unit that generates game data of a normal game in the game service including a quest or a battle against a boss character and game data of a training game including a quest or a battle against a boss character in which a type of the quest or the battle against the boss character or the difficulty in a game is adjusted in order to differentiate the content of the training game from that of the normal game;
    a player information storing unit that stores player information including registration date data indicating a date when the player operating the terminal device is registered in the game service; and a group allocation unit that determines a player group to which the player belongs based on the registration date data of the player,
    wherein the game data generation unit generates the game data of the training game to the player who belongs to the player group and wherein after the player group is once formed, each of the players in the player group is further allocated to another player group based on a game play history of the respective player in the training game.

2. The game processing server apparatus according to claim 1,
    wherein the player group is formed by players who are newly registered in the game service.

3. The game processing server apparatus according to claim 1,
    wherein the player group is formed by players who are contemporarily registered in the game service.

4. The game processing server apparatus according to claim 1,
    wherein a number of players who belong to the player group is limited.

5. The game processing server apparatus according to claim 1,
    wherein a plurality of the player groups are formed.

6. The game processing server apparatus according to claim 1,
    wherein the player group is formed based on a game play history.

7. The game processing server apparatus according to claim 1,
    wherein the game data generation unit displays ranking of each of the players in the player group.

8. The game processing server apparatus according to claim 1,
    wherein the game data generation unit generates the game data of the normal game after receiving an operation of finishing the training game from the player.

9. A non-transitory computer-readable recording medium having recorded thereon a program that causes a computer that composes a game processing server apparatus providing a game service to a plurality of terminal devices connected with each other via a network, to execute functions, comprising:
    a game data generation function that generates game data of a normal game in the game service including a quest or a battle against a boss character and game data of a training game including a quest or a battle against a boss character in which a type of the quest or the battle against the boss character or the difficulty in a game is adjusted in order to differentiate the content of the training game from that of the normal game;

a player information storing function that stores player information including registration date data indicating a date when the player operating the terminal device is registered in the game service; and a group allocation function that determined a player group to which the player belongs based on the registration date data of the player, wherein the game data generation function generates the game data of the training game to the player who belongs to the player group and wherein after the player group is once formed, each of the players in the player group is further allocated to another player group based on a game play history of the respective player in the training game.

10. The non-transitory computer-readable recording medium according to claim 9, wherein the game data generation function generates the game data of the normal game after receiving an operation of finishing the training game from the player.

11. The non-transitory computer-readable recording medium according to claim 9, wherein a number of players who belong to the player group is limited.

* * * * *